United States Patent
Taylor et al.

(10) Patent No.: US 7,287,488 B2
(45) Date of Patent: Oct. 30, 2007

(54) RACEWAY FOR CULTIVATING AQUATIC ORGANISMS

(75) Inventors: Mark Taylor, Dalby (AU); Paul McVeigh, Dalby (AU)

(73) Assignee: Total Aqua Management Systems Pty Ltd., Lismore (AU)

( * ) Notice: Subject to any disclaimer, the term of this patent is extended or adjusted under 35 U.S.C. 154(b) by 21 days.

(21) Appl. No.: 10/494,521

(22) PCT Filed: Oct. 30, 2002

(86) PCT No.: PCT/AU02/01469

§ 371 (c)(1),
(2), (4) Date: Sep. 10, 2004

(87) PCT Pub. No.: WO03/041494

PCT Pub. Date: May 22, 2003

(65) Prior Publication Data

US 2005/0034676 A1    Feb. 17, 2005

(30) Foreign Application Priority Data

Nov. 15, 2001   (AU) .................................... PR8885

(51) Int. Cl.
*A01K 61/00* (2006.01)

(52) U.S. Cl. ........................................ 119/219; 119/200

(58) Field of Classification Search ................ 119/219, 119/207, 223, 215, 221
See application file for complete search history.

(56) References Cited

U.S. PATENT DOCUMENTS 3,653,358 A     4/1972    Fremont (Continued)

FOREIGN PATENT DOCUMENTS

AU         579953         12/1988

(Continued)

OTHER PUBLICATIONS

Yoo et al. (1995) Aquacultural Engineering 14: 175-187.

(Continued)

*Primary Examiner*—Teri Pham Luu
*Assistant Examiner*—Bethany L. Griles
(74) *Attorney, Agent, or Firm*—Hoffman, Wasson & Gitler, P.C.

(57) ABSTRACT

A floatable raceway (1) for cultivating fish comprising a partially submersible tank (2) for containing fish having a base (5), opposing sidewalls (6), a gate assembly (8) having removable gates (10, 11) at a water discharge end of the tank (2), and an end wall assembly (7) at a water intake end of the tank (2) having a ramp (9) extending downwardly to the base (5) and towards the gate assembly (8). The raceway (1) also includes floats (3) extending the lengths of the sidewalls (6) for keeping a top of the tank (2) above water level, an airlift assembly (4) connectable to an air supply for introducing oxygenated water to the tank (2) at the water intake end, and a baffle (14) for directing the flow of water through the tank (2) along the base (5). The raceway (1) has a pair of screen gates (10) allowing the movement of fish wastes therethrough and a pair of stop gates (11) for substantially preventing water from discharging from the tank (2).

25 Claims, 7 Drawing Sheets

U.S. PATENT DOCUMENTS

| | | | |
|---|---|---|---|
| 3,709,195 A | 1/1973 | Tabb | |
| 3,726,251 A * | 4/1973 | Fremont | 119/228 |
| 4,029,050 A | 6/1977 | Genest | |
| 4,044,720 A | 8/1977 | Fast | |
| 4,798,168 A | 1/1989 | Vadseth et al. | |
| 4,915,059 A * | 4/1990 | Long | 119/224 |
| 4,951,606 A | 8/1990 | Hartung | |
| 5,038,715 A | 8/1991 | Fahs, II | |
| 5,450,818 A | 9/1995 | Caillouet | |
| 5,762,024 A | 6/1998 | Meilahn | |
| 6,044,798 A * | 4/2000 | Foster et al. | 119/240 |
| 6,223,689 B1 | 5/2001 | Nelson | |
| 6,851,387 B2 * | 2/2005 | Untermeyer et al. | 119/212 |

FOREIGN PATENT DOCUMENTS

| | | |
|---|---|---|
| DE | EP0347489 A2 * | 12/1989 |
| GB | 2125261 | 3/1984 |
| GB | 2232862 | 1/1991 |
| GB | 2236715 A * | 4/1991 |
| JP | EP0565793 A1 * | 10/1993 |
| WO | WO9306720 * | 10/1991 |

OTHER PUBLICATIONS

Loyless and Malone (1998) Aquacultural Engineering 18: 117-133.
U.S. Department of the Interior Fish and Wildlife Service, No. 88-85 Nov. 1998.
D. Selock article entitled "The Caillouet Floating Raceway System A Step Forward For Fish Culture": 618-997-2117.
N.C. Parker article entitled "Airlift Pumps in Recirculatory Systems".
N.C. Parker article entitled Floating Raceway System for Production of Striped Bass.

* cited by examiner

RACEWAY FOR CULTIVATING AQUATIC ORGANISMS

This invention relates to a raceway for cultivating aquatic organisms. In particular, the invention concerns a floatable raceway suitable for cultivating fish.

The raceway has been developed primarily for cultivating fish and will therefore be described in this context. It is to be appreciated, however, that the raceway can be used for cultivating other types of organisms, such as, for instance, molluscs and crustaceans.

BACKGROUND OF THE INVENTION

Fish cultivating systems are known. Such systems include cage and pond cultivating systems. Disadvantages with these types of systems include that they do not allow for total monitoring and control of cultivation conditions, they do not enable the stocked fish to be closely monitored for general growth, hygiene and disease, nor do they allow for the easy handling of fish stock. Moreover, in the event that there is an outbreak of disease, the whole body of water may need to be treated and many hours may be required in order to clean the cages and nets.

OBJECT OF THE INVENTION

It is an object of the present invention to provide a raceway for cultivating aquatic organisms such as fish that minimises at least one of the disadvantages referred to above, or to provide the public with a useful or commercial choice.

SUMMARY OF THE INVENTION

According to the present invention, there is provided a floatable raceway for cultivating aquatic organisms comprising:

a partially submersible tank for containing aquatic organisms such as fish having a base, opposing sidewalls, a gate assembly having two or more removable gates at a water discharge end of the tank, and an end wall assembly at a water intake end of the tank having a ramp extending downwardly to the base and towards the gate assembly;

one or more floats for keeping a top of the tank above water level;

an airlift assembly connectable to an air supply for introducing oxygenated water to the tank at the water intake end; and a baffle for directing water flowing through the tank along the base, wherein one or more of said gates is a screen gate allowing the movement of aquatic organism wastes therethrough and one or more of said gates is a stop gate for substantially preventing the discharge of water from the tank.

DETAILED DESCRIPTION OF THE INVENTION

The tank can be of any suitable shape and size and of any suitable construction, provided that the sidewall and base surfaces within the tank are as smooth. Preferably, the base is longer than it is wide and the sidewalls extend substantially parallel to one another and vertically from the base. If necessary, reinforcing structures, such as ribs, can extend along outer surfaces of the sidewalls and the base. The tank can comprise plastics material or any other suitable type of material or materials. The sidewalls and the base can be of unitary construction and can be produced, for instance, from a mould.

Any suitable type of float can be used. Preferably, one or more of the floats extend along an upper region of each said sidewall and serve as a walkway. Each float can comprise an elongate housing filled with air. Preferably each housing is of substantially rectangular transverse cross section. The float housing can comprise plastics material or any other suitable type of material or materials. The floats and the sidewalls can be of unitary construction.

The airlift assembly can be of any suitable construction and can comprise any suitable material, such as plastics material. The airlift assembly can include a plurality of passages for introducing oxygenated water across a width of the tank. Preferably, the airlift assembly includes a manifold for supplying air from the air supply to the passages. The manifold can include at least one operating member, such as a tap, for regulating the amount of air entering each of the passages.

The passages are preferably provided by a pair of spaced walls and a plurality of spaced intermediate walls extending parallel to one another between the spaced walls. A top of each passage can be situated above the ramp and a bottom of each said passage can be supplied with air by the manifold.

The raceway can further include a screen for preventing fish within the tank from accessing the passages. The screen can be, for instance, a screen mesh, grating or grill. Preferably, the end wall assembly includes a screen extending upwardly from the ramp adjacent the tops of the passages and the screen has openings through which oxygenated water can flow. The screen can comprise plastics material or any other suitable type of material or materials.

The raceway can further include a screen barrier for preventing fish within a body of water in which the raceway is placed from accessing the airlift assembly. The screen barrier can comprise, for instance, a screen mesh, grating or grill. The screen barrier can comprise plastics material or any other suitable type of material or materials. Preferably, the screen barrier comprises a galvanised mesh in a stainless steel frame.

The ramp is important in directing the flow of water through the tank and preventing fish wastes, including fish faeces and excess fish feed, from accumulating on the base adjacent the water intake end of the tank. That is, if the end wall assembly were to comprise an end wall extending perpendicularly from the base, then, due to the direction of the flow of water, the tank would have a "dead spot" adjacent the end wall and fish wastes would accumulate within the dead spot. The ramp can extend at any suitable angle-linearly or curvedly-towards the base and gate assembly. The ramp can, for instance, extend at an angle of 45 degrees. Preferably, the ramp extends curvedly to the base.

The baffle can be of any suitable shape and size and can consist of any suitable material or materials. Preferably, the baffle is T-shaped when viewed in side elevation, with a top of the baffle disposed on the sidewalls and a lower end of the baffle extending between the sidewalls. The baffle is positioned to create optimum water movement along the base to flush fish wastes from the tank and can also determine the optimum feeding point in the tank.

The gate assembly can be of any suitable construction. The gate assembly can have a framework connectable to the sidewalls and optionally to the base. The framework can comprise any suitable configuration of uprights and crosspieces. A top of the framework can function as a walkway for a person wishing to cross from one sidewall of the tank to the other.

The framework can define spaces or provide tracks for slidably receiving the removable gates. The framework can have vertically extending tracks and the removable gates can have opposing ends slidable within the tracks. Preferably, the framework includes spaces for slidably receiving a pair of the screen gates and a pair of the stop gates, wherein the pair of screen gates extend within a first plane and the pair of stop gates extend with a second plane that is spaced from and parallel to the first plane.

The framework can comprise any suitable material or materials such as, for instance, stainless steel. The gates can be removed from the framework for cleaning purposes or for replacement with other types of gates.

The stop gates and the screen gates can be of any suitable construction. Preferably, the stop gate comprises a wooden board, panel or a sheet of stainless steel. Preferably, the screen gate has a frame and at least a lower region of the screen gate has a mesh with openings allowing the movement of fish wastes therethrough. The frame can, for instance, comprise stainless steel and the mesh can be galvanised.

The raceway can further include a screen push gate separating, and movable between, the water intake and discharge ends of the tank. The push gate can be of any suitable construction but preferably comprises a frame with a mesh extending within the frame. The push gate can be used to sort fish according to size, wherein fish smaller than openings of the mesh can swim through the openings. The push gate can comprise any suitable material or materials. For instance, the frame can comprise stainless steel and the mesh can be galvanised.

The raceway can include means for guiding the push gate when it is being pushed from one end of the tank to the other. Preferably, an upper region of each said sidewall has a track or recess extending therealong and the push gate frame has opposing ends slidable within the tracks or recesses.

The raceway can further include at least one removable bridge for allowing persons to cross from one sidewall of the tank to the other. The bridge can be any suitable type of bridge known to persons skilled in the art and can comprise any suitable material or materials.

The raceway can include one or more covers for both shading the tank and for protecting the fish within the tank from predators. The cover can comprise, for instance, shade cloth or a tarpaulin. The cover can be connectable to the floats. The raceway can include cleats disposed on each float for attaching the cover to the floats.

The raceway can further include a feed unit for feeding the fish. The feed unit can extend between the sidewalls. Automatic and manual feed units are well known in the art.

Preferably, the raceway is of modular design. Preferably, a section of the base together with a section of each said sidewall and said floats comprise a tank extension module, and two or more said tank extension modules are connectable end-to-end to increase the length of the tank.

The gate assembly at the discharge end of the tank can be connectable to a free end of a tank extension module.

The raceway can include further gate assemblies, and these can be connected between adjacent tank extension modules.

Preferably, the end wall assembly is part of an airlift housing module having a section of each said tank sidewall and floats, and the airlift housing module is connectable to a free end of a said tank extension module. Each sidewall of the airlift housing module can extend past the end wall assembly and can have a track or recess for slidably receiving an opposing end of the airlift assembly. Each said sidewall of the airlift housing module can have another track or recess for slidably receiving an opposing end of the screen barrier. Each said sidewall of the airlift housing module can have an additional track or recess for slidably receiving an opposing end of the screen of the end wall assembly.

The modules and other parts of the raceway can be connected to one another in any suitable way. Preferably, the tank extension module and the airlift housing module have laterally extending flanges connectable together, and the gate assembly has flanges connectable to the flanges of a said tank extension module. The flanges can be connected together with, for instance, bolts.

The raceway can further include a waste collection module for collecting and disposing of fish wastes. The waste collection module can be of any suitable construction. The waste collection module can be connected to the gate assembly at the discharge end of the tank. The waste collection module preferably comprises:

a bottom wall having a trough connectable to a pump;

a pair of upstanding walls extending from the bottom wall;

an outer wall having an outlet and extending between the upstanding walls and sloping upwardly and outwardly from the bottom wall;

a waste extraction system for removing fish waste collected in the trough; and a baffle extending between the upstanding walls for directing the flow of water to the trough and for reducing the flow rate of water to the outer wall.

The waste extraction system can, for instance, comprise a drainage pipe connected to the trough and a vacuum pump connected to the pipe. The pump can transfer fish wastes from the trough to a settling tank, and water cleared of waste can be returned to the body of water in which the raceway is floating. The trough can extend across the bottom wall from one said upstanding wall to the other and can be substantially V-shaped when viewed in cross section.

The walls of the water collection module can comprise any suitable material or materials, such as plastics material.

The waste collection module baffle can be of similar construction to the tank baffle. Preferably, the waste collection module baffle is T-shaped when viewed in side elevation, with a top of the collection module baffle disposed on the upstanding walls and a lower end of the baffle extending between the upstanding walls to a point below the outer wall outlet.

The outer wall outlet can be screened with a mesh. The mesh can be sized such that fish from the body of water can enter the waste collection module and feed on fish waste collected in the trough.

The waste collection module can include flanges extending laterally from the bottom wall and the upstanding walls and said flanges can be connected to the gate assembly.

DESCRIPTION OF THE PREFERRED EMBODIMENT

In all of the drawings, like reference numerals refer to like parts.

Figure 1:
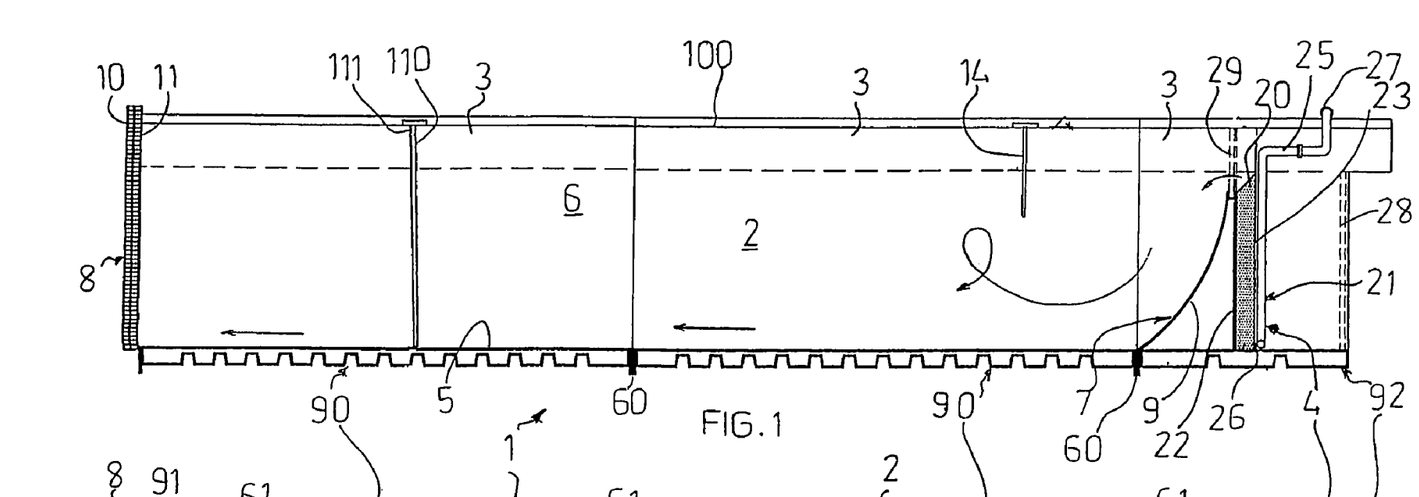
FIG. 1 is a longitudinal cross sectional view of a raceway for cultivating fish with a direction of water flow indicated by arrows, according to an embodiment of the invention.

The figures show a floatable raceway 1, or parts of the floatable raceway 1, for cultivating fish. Referring first to FIGS. 1-5, the raceway 1 includes a submersible tank 2 for containing fish, floats 3 for keeping a top of the tank 2 above water level, an airlift assembly 4 connectable to an air supply for introducing oxygenated water to the tank 2, and a baffle 14 for directing the flow of water within the tank 2 (as seen in FIG. 1).

Figure 2:
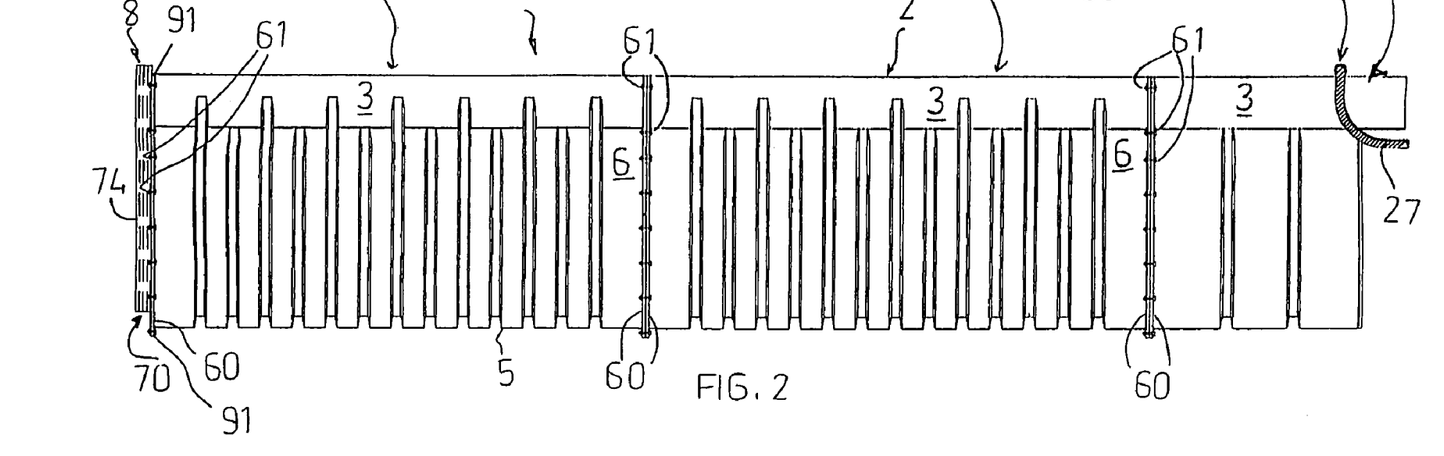
FIG. 2 is a side elevation view of the raceway shown in FIG. 1.

The tank 2 has a base 5, a pair of opposing sidewalls 6, an end wall assembly 7 having a ramp 9 at a water intake end of the tank 2, and a gate assembly 8 having removable gates 10, 11 at a water discharge end of the tank 2. The sidewall 6 and base 5 surfaces within the tank 2 are smooth in order to minimise the buildup of fish wastes, including fish faeces and uneaten feed, on these surfaces. As seen in FIG. 2, reinforcing ribs (not labelled) extend along outer surfaces of the sidewalls 6 and base 5. FIG. 1 shows that ramp 9 extends curvedly to the base 5 and towards the gate assembly 8. The end wall assembly 7 includes a screen mesh 29 extending upwardly from the ramp 9. The ramp 9 eliminates a "dead spot" in the tank. That is, it prevents the buildup of fish wastes at the water intake end of the tank 2.

Figure 3:
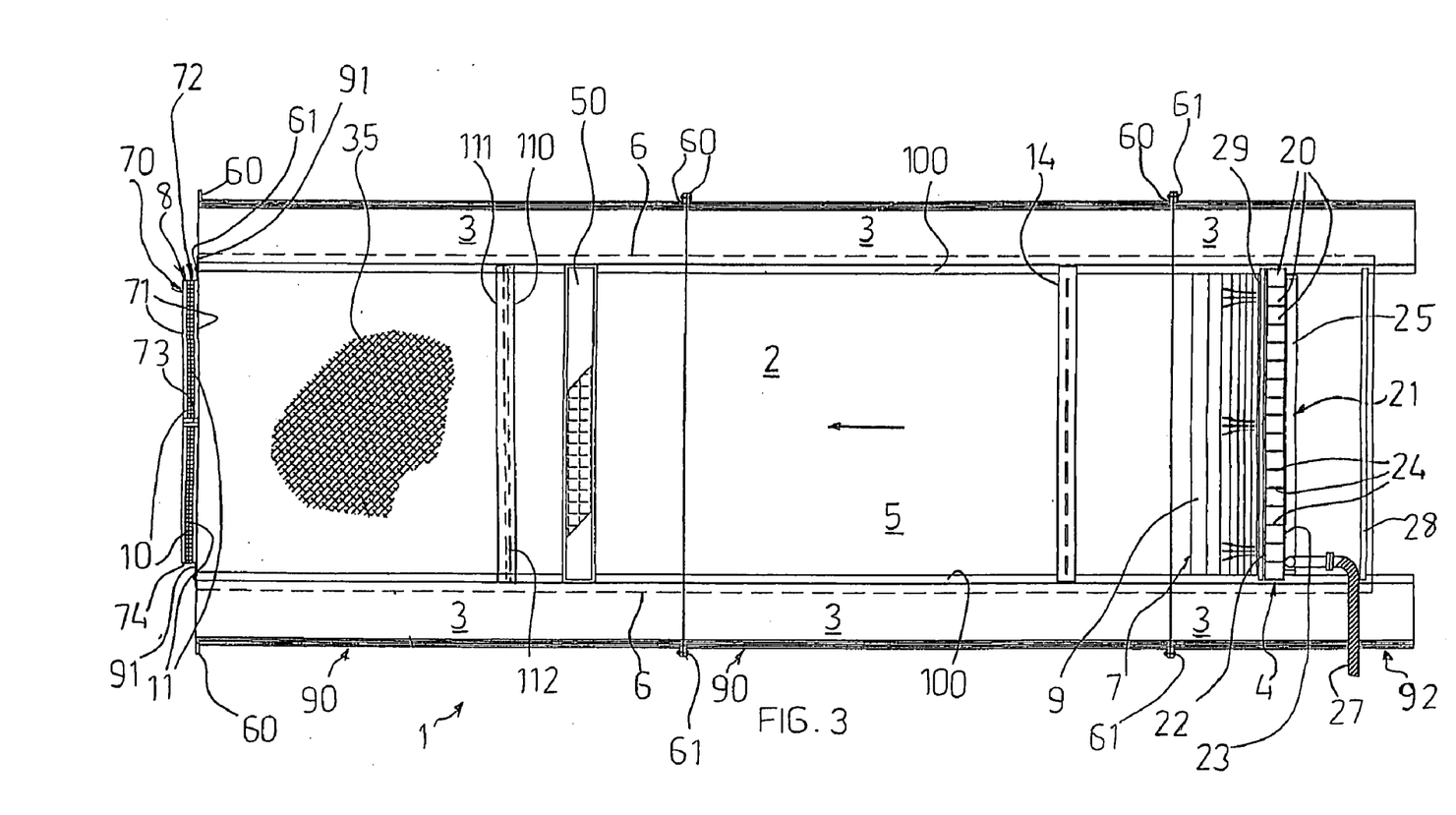
FIG. 3 is a part detailed top plan view of the raceway shown in FIG. 1.

The gate assembly 8 includes two screen gates 10, two stop gates 11 and a framework 70 for supporting the gates 10, 11 perpendicularly to the sidewalls 6. As seen in FIGS. 2, 3, 5 and 12-14, the framework 70 includes three upright members 72, 73, 74 that are connected to one another by a pair of upper crosspieces 71, a central crosspiece 76 and a lower crosspiece 75. The upper crosspieces 71 function as a walkway for a person wishing to cross from one sidewall 6 to the other 6. The uprights 72, 73, 34 and crosspieces 71, 75, 76 define spaces for slidably receiving the gates 10, 11 such that the gates 10, 11 extend in spaced parallel planes. This is best seen in FIG. 3. With this construction, the gates 10, 11 can be removed individually for cleaning purposes or for replacement with other types of gates. The framework 70 comprises stainless-steel.

Figure 5:
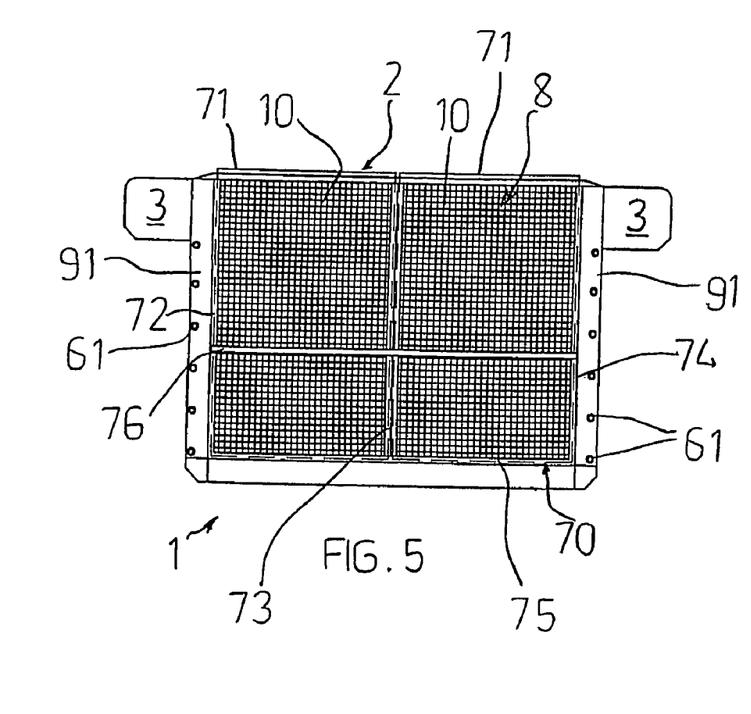
FIG. 5 is a part end elevation view of a water discharge end of the raceway shown in FIG. 1.

Each screen gate 10 comprises a rectangular stainless-steel frame and a galvanised mesh (not labelled) extending therein, as seen in FIG. 5. Fish wastes are flushed from the tank 2 through openings of the mesh.

Each stop gate 11 comprises a stainless-steel sheet, and when the stop gates 11 engage the framework 70, they substantially stop the discharge of water from the tank 2.

Referring now to FIGS. 1, 3 and 8 to 11, the airlift assembly 4 includes a plurality of passages 20 (only some of which have been labelled) for introducing oxygenated water across a width of the tank 2, and a manifold 21 for supplying air from the air supply to each of the passages 20. As seen in FIG. 3, the passages 20 are provided by pair of spaced walls 22, 23 and a plurality of spaced intermediate walls 24 (only some of which have been labelled) extending parallel to one another between walls 22, 23. The spaced walls 22, 23 and intermediate walls 24 comprise plastics material. A top of each passage 20 is situated above the ramp 9 and adjacent screen mesh 29. Air discharged from the manifold 21 into the passages 20 lifts water through the passages 20 and the screen mesh 29 and into the tank 2.

As seen in FIGS. 1 and 3, the manifold 21 includes a pipe 25, outlet nozzles 26 (shown in FIG. 1) extending between the pipe 25 and each of the passages 20, and a hose 27 connecting an end of the pipe 25 to the air supply (not shown). The manifold 21 has a tap (not shown) for regulating the amount of air entering each of the passages 20.

Figure 4:
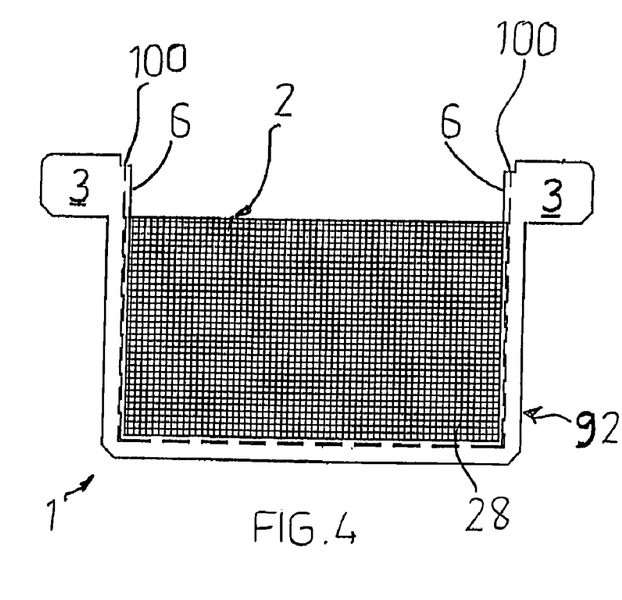
FIG. 4 is a part end elevation view of a water intake end of the raceway shown in FIG. 1.

As seen in FIG. 4, the raceway 1 includes a screen mesh 28 comprising a galvanised mesh within a stainless-steel frame for preventing fish within a body of water in which the raceway 1 floats from accessing the airlift assembly 4.

The raceway 1 has multiple floats 3 extending along an upper region of each sidewall 6. The floats 3 function as a walkway. Each float 3 comprises an elongate, substantially rectangular housing filled with air. The floats 3 and the sidewalls 6 are of unitary construction. The floats 3 are best seen in FIGS. 4 and 5.

The raceway 1 has a cover 35 (partly shown in FIG. 3) for covering the tank 2. The cover 35 comprises shade cloth and shades the tank 2 as well as protects fish within the tank 2 from predators such as birds, water rats and turtles. Cleats (not shown) secure the cover 35 to the floats 3.

The baffle 14 is T-shaped when viewed in transverse cross section. Each sidewall 6 has a shoulder/track 100 extending the length of the sidewalls on which a top of the "T" rests and a lower end of the "T" is held between the sidewalls 6. The baffle 14 is positioned to create optimum water movement along the base 5 and to determine the optimum feeding point in the tank 2.

As seen in FIG. 3 (showing a cut-away view), the raceway 1 can have a removable bridge 50 comprising a galvanised steel member with an expanded mesh top that enables a person to cross from one side of the tank 2 to the other.

FIGS. 1 and 3 show that the raceway 1 has a screen push gate 110 separating, and movable between, the water intake and discharge ends of the tank 2. The push gate 110 comprises a stainless-steel frame 111 with a galvanised mesh 112 extending within the frame 111, and a top of the frame 111 rests on shoulder 100. The push gate 110 is used to sort fish according to size, wherein fish smaller than openings of the mesh 112 can swim through the openings.

Figure 6:
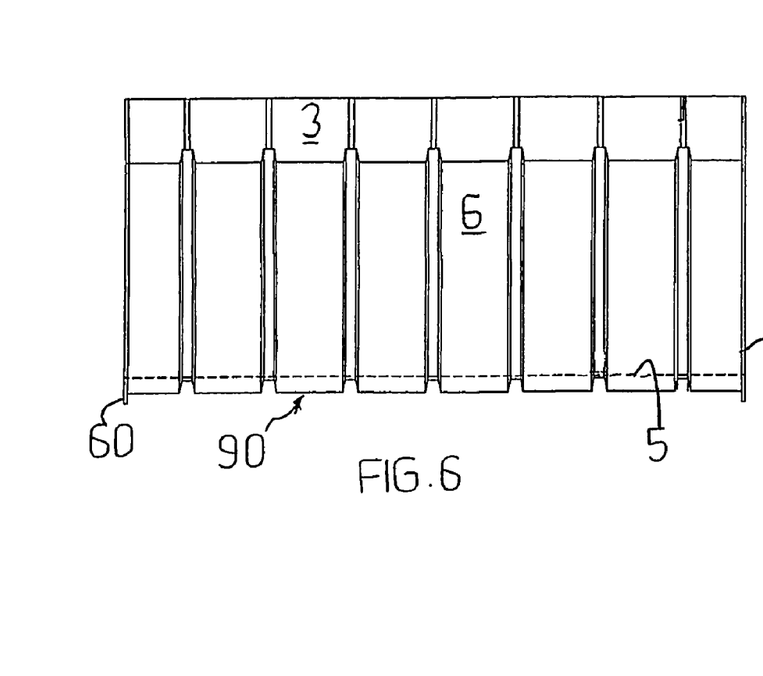
FIG. 6 is a part detailed side elevation view of a tank extension module of the raceway shown in FIG. 1.
Figure 7:
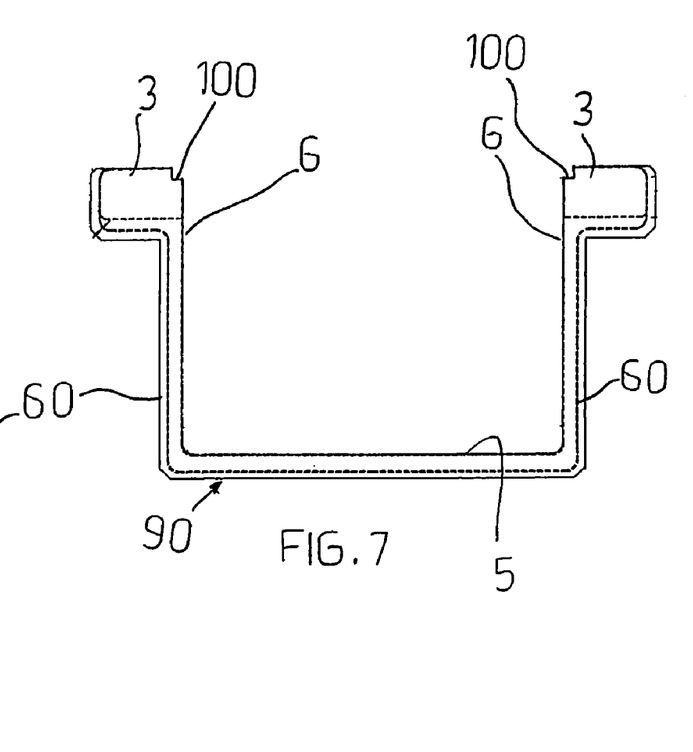
FIG. 7 is a part detailed end elevation view of the tank extension module shown in FIG. 6.

The raceway 1 is preferably of modular design. FIGS. 6 and 7 show that a section of the base 5 together with sections of the sidewalls 6 and floats 3 comprise a tank extension module 90. Module 90 is made of plastics material by a moulding process. The modules 90 are connectable end-to-end to increase the length of the tank 2. FIGS. 1-3 show a raceway 1 having two such modules 90. Each module 90 has flanges 60 extend laterally from the floats 3, sidewalls 6 and base 5, and like flanges 60 of like modules 90 are connected together with bolts 61. (Note that the flanges 60 are not clearly shown in some of the drawings).

FIGS. 2, 3 and 5 show that the gate assembly 8 has vertically extending flanges 91 that are connected to like flanges 60 of a tank extension module 90 with bolts 61 (only some of which have been labelled). Although not shown in the drawings, additional gate assemblies can be connected between adjacent tank extension modules 90 such that the overall tank can be divided into a number of smaller tanks.

FIGS. 8 to 11 show that the end wall assembly 7 is part of an airlift housing module 92 having a section of each tank sidewall 6 and floats 3. The airlift housing module 92 has flanges 60 (not clearly shown in some of the drawings) like those of the tank extension module 90, and the flanges of modules 92 and 90 are connected to one another with bolts 61. This is best seen in FIGS. 2 and 3.

Figures 8, 9, 10, 11:
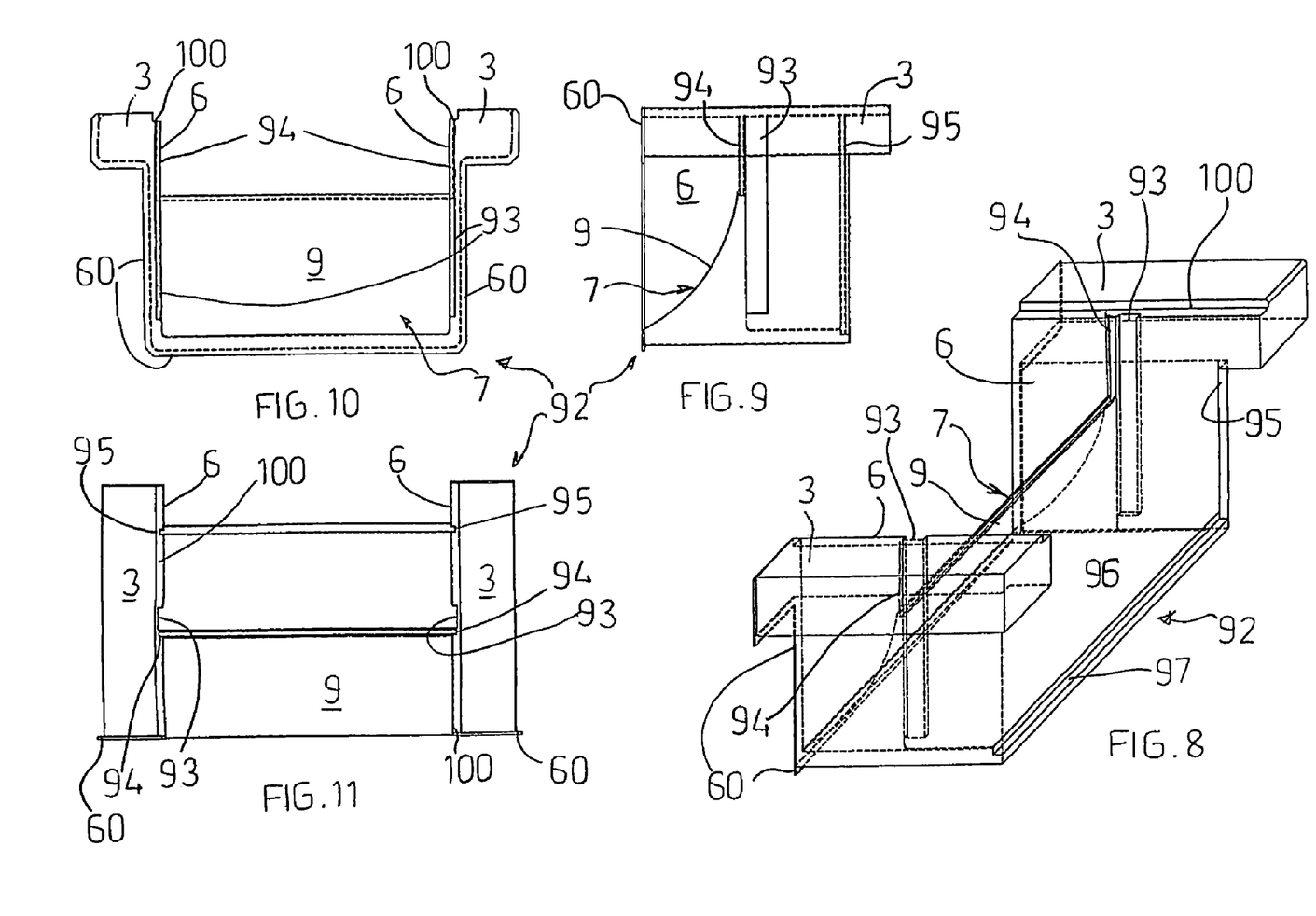
FIG. 8 is a detailed isometric view of an airlift housing module of the raceway shown in FIG. 1.
FIG. 9 is a detailed side elevation view of the airlift housing module shown in FIG. 8.
FIG. 10 is a detailed end elevation view of the airlift housing module shown in FIG. 8.
FIG. 11 is a detailed top plan view of the airlift housing module shown in FIG. 8.
Figure 12:
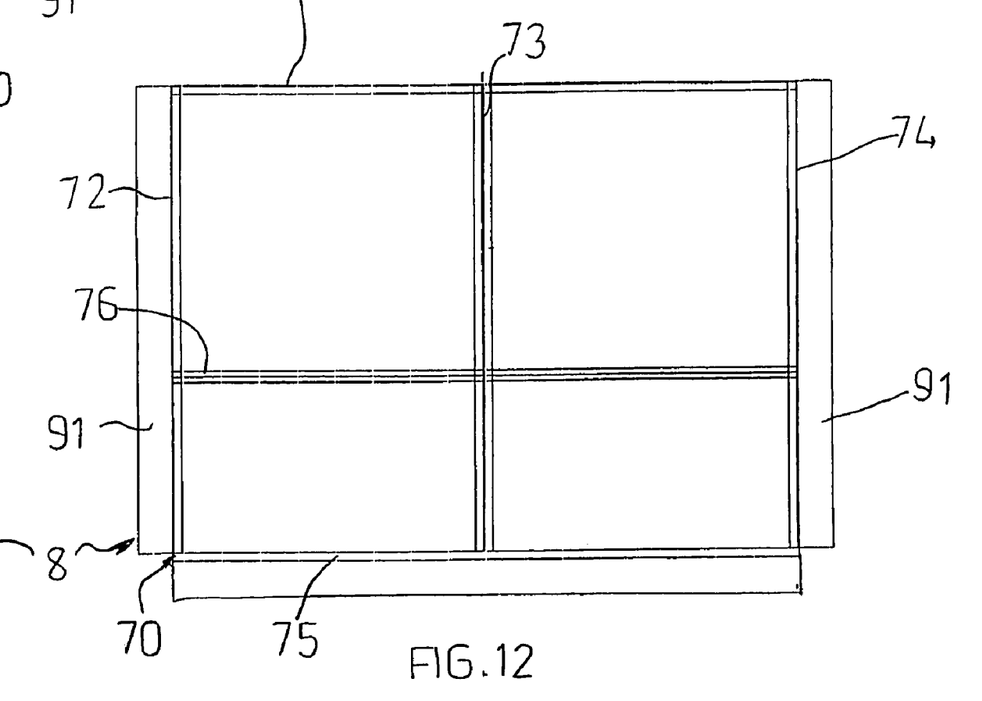
FIG. 12 is a front elevation view of part of a gate assembly of the raceway shown in FIG. 1.
Figure 13:
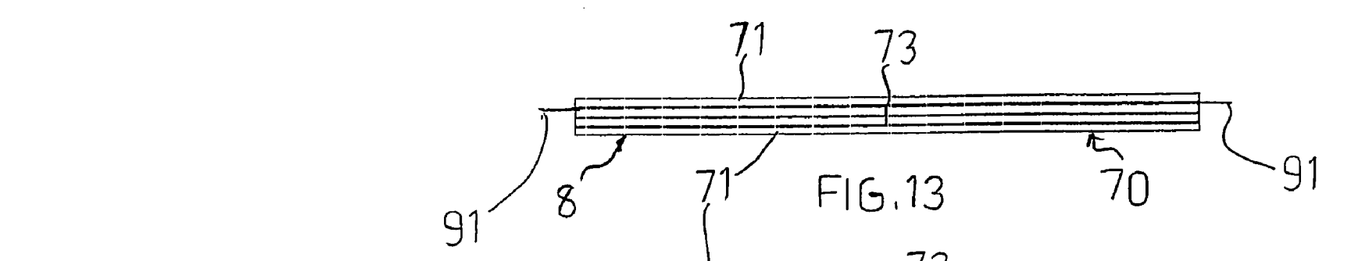
FIG. 13 is a top plan view of the gate assembly shown in FIG. 12.
Figure 14:
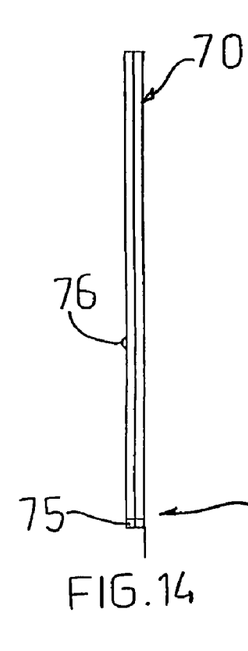
FIG. 14 is a side elevation view of the gate assembly shown in FIG. 12.

Each sidewall 6 of the airlift housing module 92 has a first recess 93 for slidably receiving opposing ends of the airlift assembly 4. This is best seen in FIG. 8. Each sidewall 6 of the airlift housing module 92 has a second recess 94 for slidably receiving an opposing end of the screen mesh 29 which extends upwardly from a groove of the ramp 9. The sidewalls 6 also have a third recess 95 for slidably receiving an opposing end of screen barrier 28, as best seen in FIGS. 9 and 11.

The airlift housing module 92 has a base 96 extending from the ramp 9 and between the sidewalls 6. The base 96 has a recess 97 in which rests a bottom of screen barrier 28.

Figure 15:
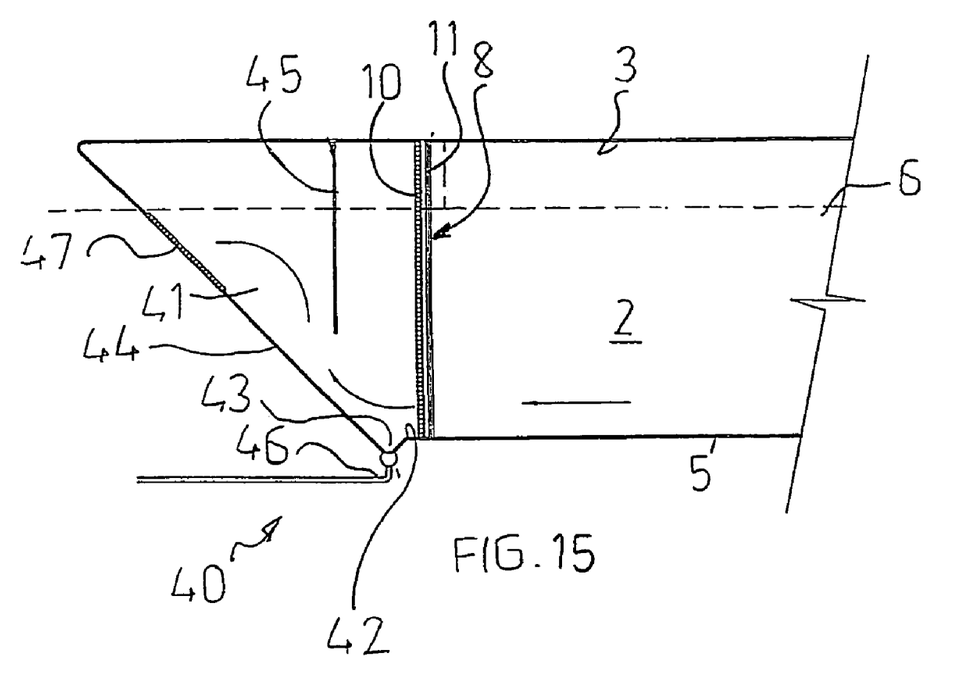
FIG. 15 is a longitudinal cross sectional view of the raceway shown in FIG. 1 when including a waste collection module, according to an embodiment of the invention.

As seen in FIG. 15, the raceway 1 can include a waste collection module 40 connected to the gate assembly 8 for collecting and disposing of fish wastes. The waste collection module 40 has a pair of sidewalls 41, a sloping end wall 44, a base 42 having a trough 43, a baffle 45, and a waste extraction system for removing waste that has collected in the trough 43. The trough 43 extends across the base 42 from sidewall 44 to sidewall 44.

The end wall 44 extends between sidewalls 41 and extends from the base 42 at an angle away from the gate assembly 8. End wall 44 has a screened outlet 47 for water.

The baffle 45 is similar to baffle 14. The baffle 45 slows the water flow rate and directs the water down past the trough 43.

The waste extraction system comprises a drainage pipe 46 and a vacuum pump (not shown) that is connected to the pipe 46. With this arrangement, waste can be pumped from the trough 43 to a settling tank and clarified water can be returned to the body of water.

Although not clearly shown in FIG. 15, the sidewalls 44 of the waste collection module 40 have laterally extending flanges like those of the gate assembly 8, and these flanges are connected to the flanges 91 of the gate assembly 8 with bolts.

The raceway 1 of the present invention has many advantages over pond and cage cultivating systems. A major advantage of the raceway 1 is that it allows total control and monitoring of cultivation conditions. The raceway 1 enables feed consumption to be monitored, analysed and adjusted on a daily basis. The raceway 1 minimises the potential loss of feed that occurs in cage and pond systems, whereby feed falls through the system nets or deposits in mud on the bottom of ponds.

The raceway 1 also enables the control and measurement of fish wastes, which is important when cultivating fish in environmentally sensitive areas. The raceway 1 further enables the fish to be closely monitored for general growth, hygiene and disease. In the event that there is an outbreak of disease, the water in the tank 2 can be isolated by way of stop gates 11, and the fish within the tank 2 can be readily treated. In a pond cultivating system, the entire body of water would have to be treated. The labour time required to treat a raceway 1 is approximately 15 to 20 minutes, yet to treat a cage of a cage cultivating system could take up to six man hours by the time the cage is isolated enough to treat.

Yet another advantage of the raceway 1 is that the airlift assembly 4 is an efficient way of moving water within the tank 2 together with increasing the dissolved oxygen content of the water. The volume of water contained in the raceway 1 is usually completely changed every few minutes (depending on the volume of the tank) thus creating an extremely beneficial environment for the fish to live and grow in.

The raceway 1 also offers advantages in the handling of fish stock. Grading can be carried out so as to keep fish stocks at a more equal size, which allows for more even growth and competitiveness. Initial grading can be done with the use of the push gate 10 having a screen allowing small fish to swim through and larger fish to be pushed to one end of the raceway for harvesting or transfer to another raceway. The push gate 11O eliminates the need to handle all stock in the raceway 1. Moreover, the raceway 1 can have more than one gate assembly 8 for creating multiple tanks within the one raceway 1.

Another advantage is that the raceway 1 minimises the problem posed by predators such as birds, water rats and turtles in that the tank 2 can be fully covered.

The raceway 1, when in modular form, is easy to transport and is strong upon assemblage. Furthermore, the raceway 1 can be readily manoeuvred within a body of water and multiple raceways can be secured to one another. The floats 3 double as walkways and this allows for easy access to the tanks 2 for inspection and cleaning purposes.

Whilst the above has been given by way of illustrative example of the invention, many modifications and variations may be made thereto by persons skilled in the art without departing from the broad scope and ambit of the invention as herein set forth.

The invention claimed is:

1. A floatable raceway for cultivating aquatic organisms comprising:

a partially submersible tank for containing aquatic organisms such as fish having an elongate base, opposing sidewalls extending from the base, a gate assembly having two or more removable gates at a water discharge end of the tank, and an end wall assembly at a water intake end of the tank having a ramp extending downwardly to the base and towards the gate assembly;

one or more floats for keeping a top of the tank above water level and for keeping the base substantially parallel with the water's surface;

an airlift assembly connectable to an air supply for introducing oxygenated water to the tank and across a width of the tank at the water intake end; and a baffle extending between the sidewalls and located adjacent the water intake end for directing water flowing through the tank along the base, wherein one or more of said gates is a screen gate allowing the movement of aquatic organism wastes therethrough and one or more of said gates is a stop gate for substantially preventing the discharge of water from the tank.

2. The raceway of claim 1, wherein said floats extend along an upper region of each said sidewall.

3. The raceway of claim 2, wherein each said float comprises an elongate housing filled with air and the housing serves as a walkway.

4. The raceway of claim 1, wherein the airlift assembly includes a plurality of passages for introducing oxygenated water across the width of the tank.

5. The raceway of claim 4, wherein the airlift assembly includes a manifold for supplying air from the air supply to the passages.

6. The raceway of claim 5, wherein the passages are provided by a pair of spaced walls and a plurality of spaced intermediate walls extending parallel to one another between the spaced walls, and a top of each said passage is situated above the ramp and a bottom of each said passage is supplied with air by the manifold.

7. The raceway of claim 6, wherein the end wall assembly includes a screen extending upwardly from the ramp adjacent the tops of the passages and the screen has openings through which oxygenated water can flow.

8. The raceway of claim 1, wherein the ramp extends curvedly to the base.

9. The raceway of claim 1 further including a screen barrier for preventing fish within a body of water in which the raceway is placed from accessing the airlift assembly.

10. The raceway of claim 1, wherein the baffle is T-shaped when viewed in side elevation with a top of the baffle disposed on the sidewalls and a lower end of the baffle extending between the sidewalls.

11. The raceway of claim 1, wherein the gate assembly includes a framework having spaces for slidably receiving a pair of said screen gates and a pair of said stop gates, wherein the pair of screen gates extend within a first plane and the pair of stop gates extend with a second plane that is spaced from and parallel to the first plane.

12. The raceway of claim 11, wherein a top of the framework functions as a walkway.

13. The raceway of claim 1 further including a screen push gate separating, and movable between, the water intake and discharge ends of the tank, wherein the screen push gate has openings enabling aquatic organisms of a certain size to swim therethrough.

14. The raceway of claim 13, wherein an upper region of each said sidewall has a track extending therealong and the push gate has opposing ends slidable within the tracks.

15. The raceway of claim 1 further including one or more covers connectable to the floats for both shading the tank and for protecting aquatic organisms within the tank from predators.

16. The raceway of claim 1, wherein a section of the base together with a section of each said sidewall and said floats comprise a tank extension module, and two or more said tank extension modules are connectable end-to-end to increase the length of the tank.

17. The raceway of claim 16, wherein the gate assembly is connectable to a free end of a said tank extension module.

18. The raceway of claim 17, wherein the end wall assembly is part of an airlift housing module having a section of each said tank sidewall and floats, each said sidewall of the airlift housing module extends past the end wall assembly and has a track or recess for slidably receiving an opposing end of the airlift assembly, and the airlift housing module is connectable to a free end of a said tank extension module.

19. The raceway of claim 18, wherein the tank extension module and the airlift housing module have laterally extending flanges connectable together, and the gate assembly has flanges connectable to the flanges of a said tank extension module.

20. The raceway of claim 19 further including at least one additional gate assembly connectable between two said tank extension modules.

21. The raceway of claim 1 further including a waste collection module connected to the gate assembly for collecting and disposing of aquatic organism wastes, said waste collection module comprising:

a bottom wall having a trough connectable to a pump;

a pair of upstanding walls extending from the bottom wall;

an outer wall having an outlet and extending between the upstanding walls and sloping upwardly and outwardly from the bottom wall;

a waste extraction system for removing aquatic organism waste collected in the trough; and a baffle extending between the upstanding walls for directing the flow of water to the trough and for reducing the flow rate of water to the outer wall.

22. The raceway of claim 21, wherein the trough extends across the bottom wall from one said upstanding wall to the other.

23. The raceway of claim 21, wherein the waste extraction system comprises a drainage pipe connected to the trough and a vacuum pump connected to the pipe.

24. The raceway of claim 21, wherein the waste collection module baffle is T-shaped when viewed in side elevation, with a top of the collection module baffle disposed on the upstanding walls and a lower end of the baffle extending between the upstanding walls to a point below the outer wall outlet.

25. The raceway of claim 21, wherein the outer wall outlet is screened with a mesh.

* * * * *